United States Patent [19]

Heurtel

[11] 4,209,576
[45] Jun. 24, 1980

[54] ASSEMBLY OF A GROUP OF ELECTRODES AND A TERMINAL OF A STORAGE CELL

[75] Inventor: Jean-Louis Heurtel, Gradignan, France

[73] Assignee: Saft-Societe des Accumulateurs Fixes et de Traction, Romainville, France

[21] Appl. No.: 9,071

[22] Filed: Feb. 2, 1979

[30] Foreign Application Priority Data

Feb. 28, 1978 [FR] France .............................. 78 05665

[51] Int. Cl.² .............................................. H01M 2/26
[52] U.S. Cl. .................................... 429/161; 429/211
[58] Field of Search ........................ 429/161, 178, 211

[56] References Cited

U.S. PATENT DOCUMENTS

| 306,405 | 10/1884 | Lachlan | 429/161 |
| 668,295 | 2/1901 | Muhle | 429/161 |
| 3,369,937 | 2/1968 | Himy | 429/161 |
| 3,522,507 | 8/1970 | Seiger | 429/178 |
| 4,098,966 | 7/1978 | Brown | 429/161 |

*Primary Examiner*—Donald L. Walton
*Attorney, Agent, or Firm*—Kenyon & Kenyon

[57] ABSTRACT

Pairs of electrodes, each electrode including a plate head electrically connected to a terminal by a thin metal tape. The electrodes are connected together in pairs by the thin metal tapes, and the metal tapes are superposed and fixed onto a terminal by welding, screwing or riveting. Particularly applicable to parallelepipedic alkaline storage cells with sintered plate electrodes on metal strip support cores.

10 Claims, 8 Drawing Figures

ASSEMBLY OF A GROUP OF ELECTRODES AND A TERMINAL OF A STORAGE CELL

The present invention relates to the assembly of a storage cell terminal with a group of electrodes, each electrode being in the form of a plate provided with a plate head. It is known that in a storage cell the electrodes of one polarity which form one group are connected to the terminal of corresponding polarity by devices which simultaneously hold the group together and conduct electric current. The terminal itself passes through the cover of the storage cell, and while the electrodes are connected to the part of the terminal situated inside the storage cell, the outside part receives electric connection wires.

French Pat. No. 74 29 502 published under U.S. Pat. No. 2,283,558, describes such an assembly, in which the plate heads are connected together in two groups and are welded on either side of the part of the corresponding terminal which is situated inside the storage cell. The number of juxtaposed plate heads is limited, however, by the effectiveness of the weld, and the group of electrodes is divided into two parts welded on either side of the terminal.

The present invention aims to reduce the number of welds while maintaining their effectiveness and thereby facilitating automation of assembly of storage cells of this type.

The invention provides an assembly of a group of electrodes and a terminal for a storage cell, wherein each electrode is in the form of a plate provided with a plate head which is electrically connected to the terminal, wherein the plate heads are connected together in pairs by thin metal tapes, and the metal tapes are superposed and fixed to the terminal.

In this way, the number of welds is reduced to one, without thereby increasing the number of layers of metal to be welded together and to the terminal.

The invention is particularly applicable to electrodes which include a metal support core in the form of a metal sheet or strip, which carries active material in sintered or compressed layers on one or both sides. In the above type of electrode the plate head is formed by a part of the metal strip. It is easy to attach a metal tape to the plate head (e.g., by welding). The metal tape should have a thickness which is approximately the same as that of the metal strip.

In a preferred embodiment which, however, can be applied only to relatively small electrodes, the metal tapes are integral with the metal strips which constitute the cores and the plate heads.

The superposed metal tapes are fixed to the terminal by any suitable method: welding, riveting, fixing by nuts or by screws.

The invention will be better understood from the following description of the embodiments with reference to the accompanying drawings in which.

Figure 1:
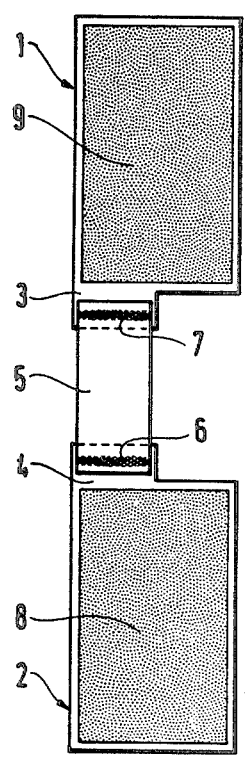
FIG. 1 illustrates two elecrodes connected together in an embodiment in accordance with the invention.

In FIG. 1, two electrodes 1 and 2 in the form of plates are illustrated, with their respective layers of sintered active mass 9 and 8 and their respective plate heads 3 and 4. The plate heads comprise bared portions of respective metal strips which also constitute the cores of the electrodes. A metal tape 5, analogous to the said strip metal, interconnects the two plate heads 3 and 4, to which it is welded respectively at 7 and 6. These two electrodes constitute a unit of a group of electrodes in accordance with the invention.

Figure 2:
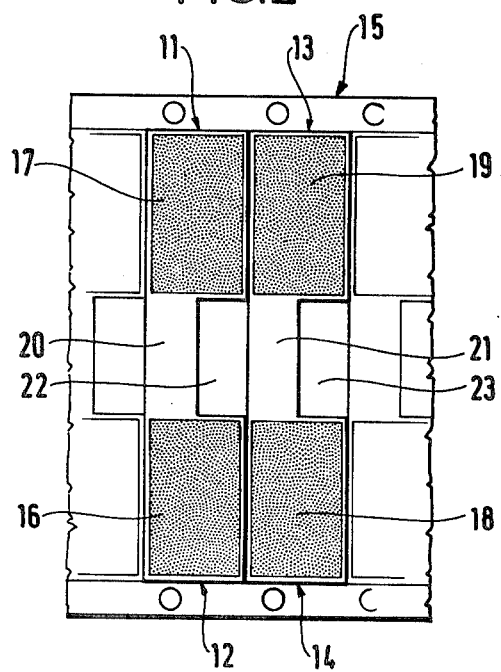
FIG. 2 illustrates four electrodes connected together in pairs in another embodiment in accordance with the invention.

Another way in which analogous units can be constituted is illustrated in FIG. 2 where electrodes 11, 12, 13 and 14 are cut out of a single strip 15. They bear respective sintered masses of active material 17, 16, 19 and 18 and can be obtained, for example, as follows. The strip 15 comprises a metal strip which has on each surface two parallel tracks of sintered mass which are as wide as the masses 16, 17, 18 and 19, the remainder being bare strip metal. The four electrodes can be cut out from the strip 15 by a single tool so that they remain connected together in pairs at 20 and 21 by a bare length of strip metal (11 to 12 and 13 to 14), the portions 22 and 23 being cut out. The combined plate heads and tapes 20 and 21 replace the assembly of plate heads 3 and 4 and tape 5 of FIG. 1. Therefore, two units of the group of electrodes in accordance with the invention are obtained, said units being analogous to the one shown in FIG. 1.

The configuration illustrated in FIG. 2 has some advantages over that shown in FIG. 1, in that it does not require a separate tape to be fixed to the plate heads of the two electrodes. This dispenses with at least one operation and provides better electrical conductivity between the electrodes. It is limited only by the width of the strip 15, which cannot be increased indefinitely, for reasons of convenience in handling operations required for depositing the sintered masses.

Figure 3:
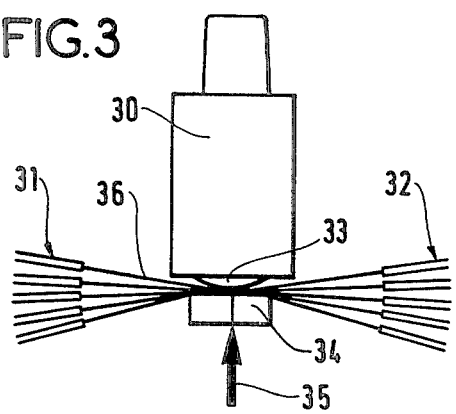
FIG. 3 illustrates partially a group of electrodes being welded on a terminal in an embodiment in accordance with the invention.

Once these units are formed, whether they are those illustrated in FIG. 1 or those illustrated in FIG. 2, they are stacked and fixed to a terminal 30, as shown in FIG. 3. On its surface facing the electrodes of the storage cell, the terminal 30 is provided with a protrusion 33. Electrodes 31 connected to electrodes 32 by tapes 36 (analogous either to the tapes 5 of FIG. 1 or to the portions 20 and 21 of FIG. 2), are stacked under the terminal. A part 34 in the form of a pellet, which is, for example, polygonally shaped, is placed in such a way that it presses the tapes 36 against the protrusion 33. The assembly thus formed is brought to an electric welding unit so that one of the electrodes of the latter is placed on the terminal 30 and that the other electrode is applied against the part 34 in the direction of the arrow 35.

Figure 4:
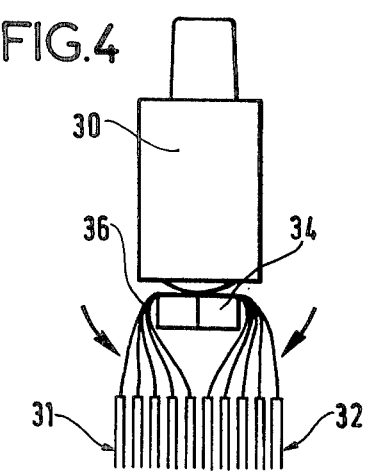
FIG. 4 illustrates partially the same group of electrodes as that in FIG. 3, forming an assembly in accordance with the invention.

After the assembly is welded, the tapes 36 are folded back as shown in FIG. 4 so as to bring the electrodes 31 and 32 into a position parallel to the axis of the terminal 30.

Figure 5:
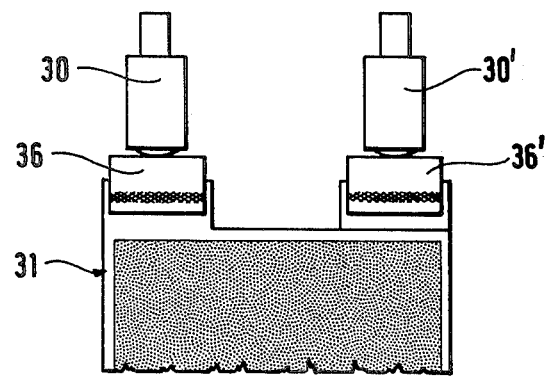
FIG. 5 illustrates partially the two storage cell terminals attached to their respective groups of plates in an embodiment in accordance with the invention.

When the positive and negative groups of a storage cell are produced in this way, one of them is provided with a separator and they are sandwiched between one another in the usual way, as shown in FIG. 5, in which the reference numerals are the same as those in FIGS. 3 and 4 for the assembly of one polarity, while the same reference numerals, primed, are used for the assembly of the other polarity.

Figure 6:
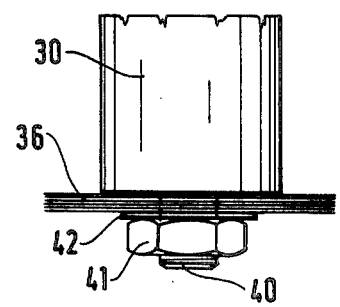
FIGS. 6, 7 and 8 illustrate partially three variants of the assembly in accordance with the invention.
Figure 7:
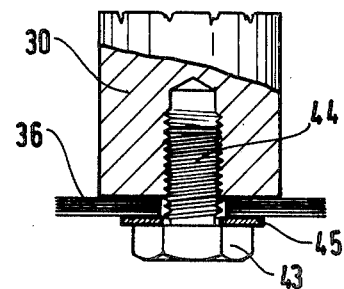
Figure 8:
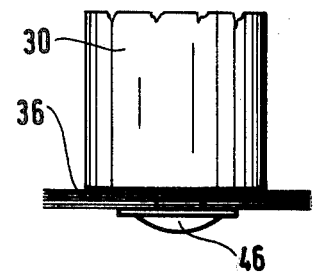

FIGS. 6, 7 and 8 illustrate other modes of fixing tapes 36 to the terminal 30. All these modes require the tapes 36 in FIG. 3 to be perforated.

FIG. 6 shows the lower part of the terminal 30 provided with a threaded stud 40 which passes through the tapes 36, which are compressed onto the terminal 30 by a nut 41, a tightening washer 42 being interposed between the nut and the tapes.

FIG. 7 shows a variant in which a recess 44 is tapped in the terminal 30 to receive a screw 43, the head of the screw clamping the tapes 36 against the terminal 30, and a washer being interposed between the tapes and the screw head.

FIG. 8 shows yet another variant, in which the tapes 36 are clamped against the terminal 30 by a rivet 46 which forms a part of the terminal.

Of course, the invention is not limited to the embodiments which have just been described and without going beyond the scope of the invention, any disposition can be replaced by an equivalent disposition.

I claim:

1. An assembly of a plurality of electrodes and a terminal for a storage cell, wherein each electrode is in the form of a plate provided with a plate head and means for electrically connecting each plate head to the terminal, wherein the improvement comprises:
said plurality of electrodes being divided into two equal groups, each electrode in one of the groups being paired with an electrode in the other group and
said connecting means being a thin flexible metal tape connecting the plate head of each electrode in one of the groups with the plate head of its paired electrode in the other group, the metal tapes of the connected pairs of electrode plates in the two groups being superposed and fixed to the terminal.

2. An assembly according to claim 1, wherein each electrode includes a strip metal core, the plate head and the core of each electrode being cut out in a single piece from a single metal strip, and wherein each tape is made of strip metal of the same thickness as the core of each electrode and is welded to the plate heads of its pair of electrodes.

3. An assembly according to claim 1, wherein each electrode includes a strip metal core, and for each pair of connected electrodes, the electrode cores, the plate heads, and the connecting tape are a single continuous metal strip.

4. An assembly according to any one of claims 1 to 3, wherein the metal tapes are fixed to the terminal by welding.

5. An assembly according to any one of claims 1 to 3, wherein the metal tapes are fixed to the terminal by riveting.

6. An assembly according to any one of claims 1 to 3, wherein the metal tapes are fixed to the terminal by means of a stud on the terminal.

7. An assembly according to any one of claims 1 to 3, wherein the tapes are fixed to the terminal by means of a screw threaded into a tapped hole in the terminal.

8. An assembly according to any one of claims 1, 2, or 3, wherein the connecting metal tapes for all the pairs of electrodes in the two groups are equal in length.

9. An assembly according to claim 8, wherein the electrode plates of each group are arranged in substantially parallel relation; the two groups are arranged in substantially parallel adjacent relation, with each connected pair of electrodes being disposed symmetrically with respect to a central plane between the two groups; and each connecting tape is fixed to the terminal at a location approximately midway between the plate heads of its pair of electrodes, whereby the assembly forms a compact stack of electrodes.

10. An assembly according to claim 3, wherein the single metal strips forming the electrode cores, plate heads, and connecting tape of each of the electrode pairs are identical to each other.

* * * * *